United States Patent [19]

Parsons et al.

[11] Patent Number: 4,924,390
[45] Date of Patent: May 8, 1990

[54] METHOD FOR DETERMINATION OF EARTH STRATUM ELASTIC PARAMETERS USING SEISMIC ENERGY

[75] Inventors: Roger Parsons; Robert H. Stolt, both of Ponca City

[73] Assignee: Conoco, Inc., Ponca City, Okla.

[21] Appl. No.: 161,257

[22] Filed: Feb. 22, 1988

Related U.S. Application Data

[63] Continuation of Ser. No. 707,838, Mar. 4, 1985, abandoned.

[51] Int. Cl.$^5$ .................. G06F 15/20; G01V 1/36; G01V 1/30; G01V 1/34
[52] U.S. Cl. .................................... 364/421; 367/38; 367/37
[58] Field of Search .................. 364/420, 421; 367/37, 367/38, 14, 75, 117, 68

[56] References Cited

U.S. PATENT DOCUMENTS

| 4,393,488 | 7/1983 | Gassaway et al. | 367/75 |
| 4,437,176 | 3/1984 | Mack | 367/38 |
| 4,534,019 | 8/1985 | Wiggins et al. | 364/421 X |

Primary Examiner—Jerry Smith
Assistant Examiner—Charles B. Meyer

[57] ABSTRACT

A method of processing seismic data involves the input of common depth point data for determination of obliquity of downward propagating energy. Data having known surface offset and travel time is then processed with interval velocities along the depth of survey to solve by matrix inversion for the earth elastic parameters at selected depths.

5 Claims, 4 Drawing Sheets

METHOD FOR DETERMINATION OF EARTH STRATUM ELASTIC PARAMETERS USING SEISMIC ENERGY

This is a continuation of copending application Ser. No. 707,838, filed on Mar. 4, 1985, and now abandoned.

BACKGROUND OF THE INVENTION

1. Field of the Invention

The invention relates generally to computer-aided processing of seismic energy and, more particularly, but not by way of limitation, it relates to a specific method of processing wherein the elastic parameters of an earth substratum, such as pressure modulus, density and shear modulus, are determinable in relative value using conventionally acquired seismic survey data.

2. Description of the Prior Art

Applicants are not aware of any prior art that relates to the procedures of the present invention. Prior inquiry indicates that U.S. Pat. Nos. 4,316,267 and 4,316,268 are of interest due only to the fact that they relate generally to identification of gas-bearing hydrocarbon zones from seismic data; however, these teachings are directed to a different form of compressional wave evaluation wherein a progressive comparison of Common Depth Point event indications is examined for high intensity amplitude anomalies in adherence to selected criteria which will tend to verify presence of gas in the formation. The primary teaching of the patent is of little interest relative to the present invention as it is directed to an entirely different form of evaluation procedure.

SUMMARY OF THE INVENTION

The present invention relates to a method for processing common depth point seismic data to derive relative changes in the elastic parameters of substratum. Resolution of pressure modulus, density and shear modulus relative change is effected by inversion of acoustic reflection data for a selected terrain. The method processes plural groups of common depth point data using the Born approximation for the obliquity of downward propagating energy to determine the relative changes in the elastic parameters at downwardly displaced formations. The CDP seismic data, a function of surface offset and energy travel time, is processed along with an estimate of selected interval velocities along the depth of survey in order to determine a function of the angle of incidence of energy at each reflector depth. A linear system relating to the obliquity factor and including relationships for pressure modulus, density and shear modulus is then solved by matrix inversion for each depth of interest.

Therefore, it is an object of the present invention to provide a method for deriving direct gas production likelihood indication utilizing conventional common depth point seismic data.

It is also an object of the present invention to provide a method for deriving data indicative of gas bearing formations with greater reliability.

Finally, it is an object of the invention to provide a method that is applicable to conventional seismic file data to provide yet another interpretation tool relative to hydrocarbon presence.

Other objects and advantages of the invention will be evident from the following detailed description when read in conjunction with the accompanying drawings which illustrate the invention.

DETAILED DESCRIPTION OF THE INVENTION

The present invention accomplishes inversion of seismic reflection data, using a programmed digital computer, to determine selected elastic parameters for earth formations at various depths. The method functions with input of multiple offset seismic data of the type commonly collected in field surveys and processed as common depth point or common mid-point data. This is a well-known seismic energy evaluation technique as used extensively in the industry, such common depth point data being preprocessed in conventional manner to correct for static and dynamic signal variations. The present method treats the data still further to determine and output the relative changes of the elastic parameters pressure modulus, density and shear modulus for subsurface interfaces at selected depths (having known average seismic interval velocity). For best results, the process is limited to locally layered media, i.e. substrata that exhibit locally negligible lateral change in elastic parameters along the length of the seismic survey line.

In the usual and conventional form of seismic reflection data analysis, the reflectors obliquity is ignored. That is, the process is not concerned with the dependence of the seismic reflection strength to the angle of incidence of the seismic wave front to a respective reflector. The result of such conventional analysis is to define a reflection strength at each depth or interface that is averaged over the different angles of incidence that correspond to the different offsets. Thus, composited reflection data for that stratum tends to produce an average event for each two-way vertical travel time, (i.e. depth).

Figure 1:
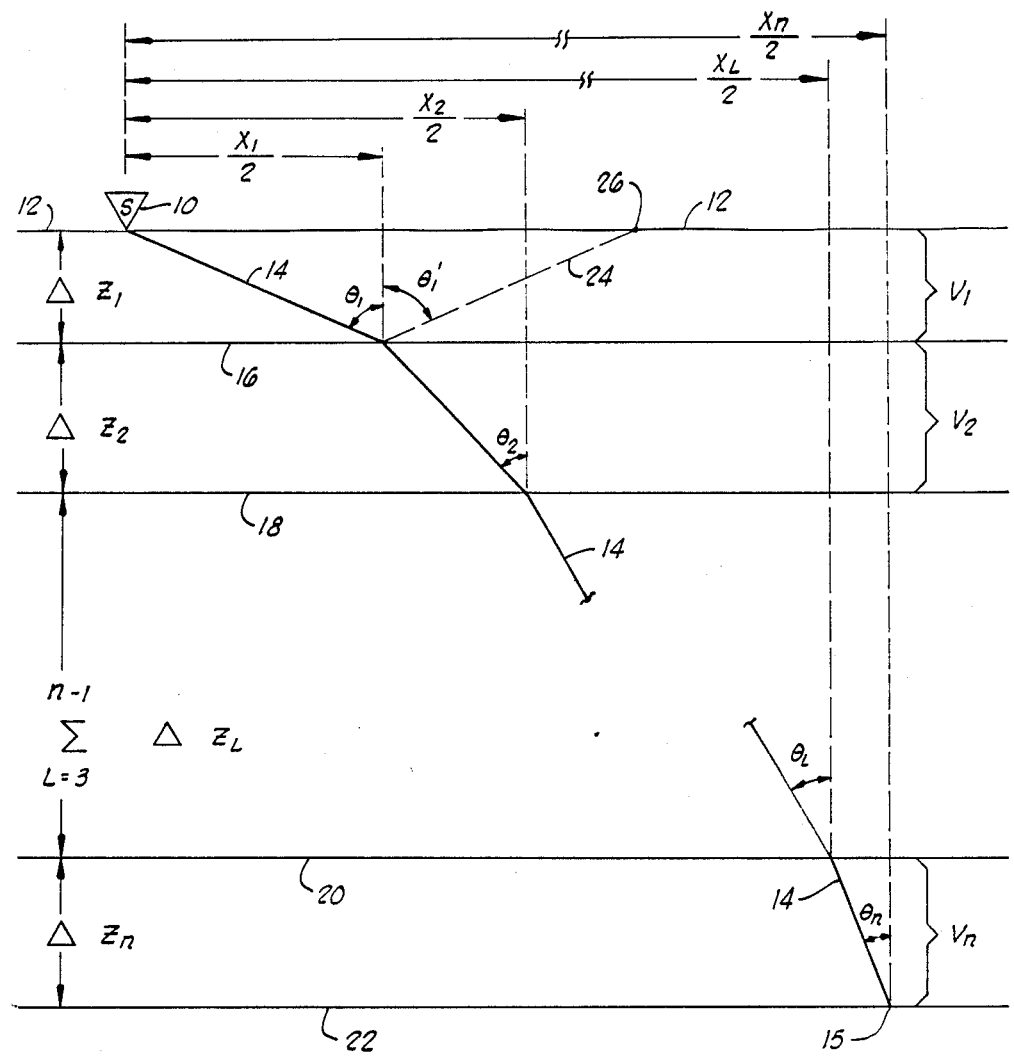
FIG. 1 is an idealized drawing of an earth section showing selected strata and seismic energy propagation.

The present method uses the Born approximation of the obliquity factor in order to determine the relative changes in the elastic parameters at each depth. FIG. 1 illustrates a typical common depth point "CDP" under test, or at least a portion of one, wherein a seismic source 10, such as a vibrator or other energy source, is engaged at earth surface 12 to impart energy to the subsurface. To illustrate by means of a single raypath 14 that behaves in accordance with Snell's law which states that $$\frac{\sin\theta_L}{V_L} = \frac{\sin\theta_n}{V_n} \qquad (1)$$

FIG. 1 illustrates the change in the angle of incidence $\theta$ as raypath 14 proceeds deeper through the substratum $Z_1$-$Z_n$ relative to common depth point 15. The interfaces 16, 18, 20 and 22 each reflects seismic energy in accordance with the angle of incidence at that depth.

At stratum 16, raypath energy 24 (dash-line) would reflect at angle $\theta'_1$ to point 26 on surface 12 and, similarly, reflected energy from each of stratum 18-22 would reflect at the respective angle $\theta$ for that particular stratum. Energy passing through the successive stratum are refracted successively at different angles $\theta_2$-$\theta_n$.

If D is designated as the reflection data, i.e. the seismic impulse response minus the direct wave, then a result of a far field WKBJ approximation of the acoustic wave equation is that D is a product of the impulse response for reflectors having no obliquity A and an obliquity factor 0. Thus, $$D = A \cdot O \qquad (2)$$

Divergence A depends only upon the depth z and the shotreceiver offset x. The obliquity factor 0 depends upon the angle of incidence of the raypath 14 at z ($\theta$) and relative changes in the elastic parameters at the depth z. These relative changes are:

$$\text{Pressure modulus at } z = \frac{d\ln\gamma}{dz} \qquad (3)$$

$$\text{Density at } z = \frac{d\ln\rho}{dz}, \text{ and} \qquad (4)$$

$$\text{Shear Modulus at } z = \frac{d\ln\mu}{dz}. \qquad (5)$$

In the Born approximation, the obliquity factor 0 is $$O(\theta,z) = \frac{(1+\tan^2\theta)}{4}\frac{d\ln\gamma}{dz} + \frac{(1-\tan^2\theta)}{4}\frac{d\ln\rho}{dz} - 2\sin^2\theta \frac{V_s^2}{V_p^2}\frac{d\ln\mu}{dz} \qquad (6)$$

where the velocities shear and compressional, $V_s$ and $V_p$, may be taken as the locally averaged shear and compressional velocities, respectively. Thus, it is only necessary to obtain a gross average of the velocities and these may be determined by standard velocity estimation methods using reflection travel times from data over a thousand feet or more.

Figure 2:
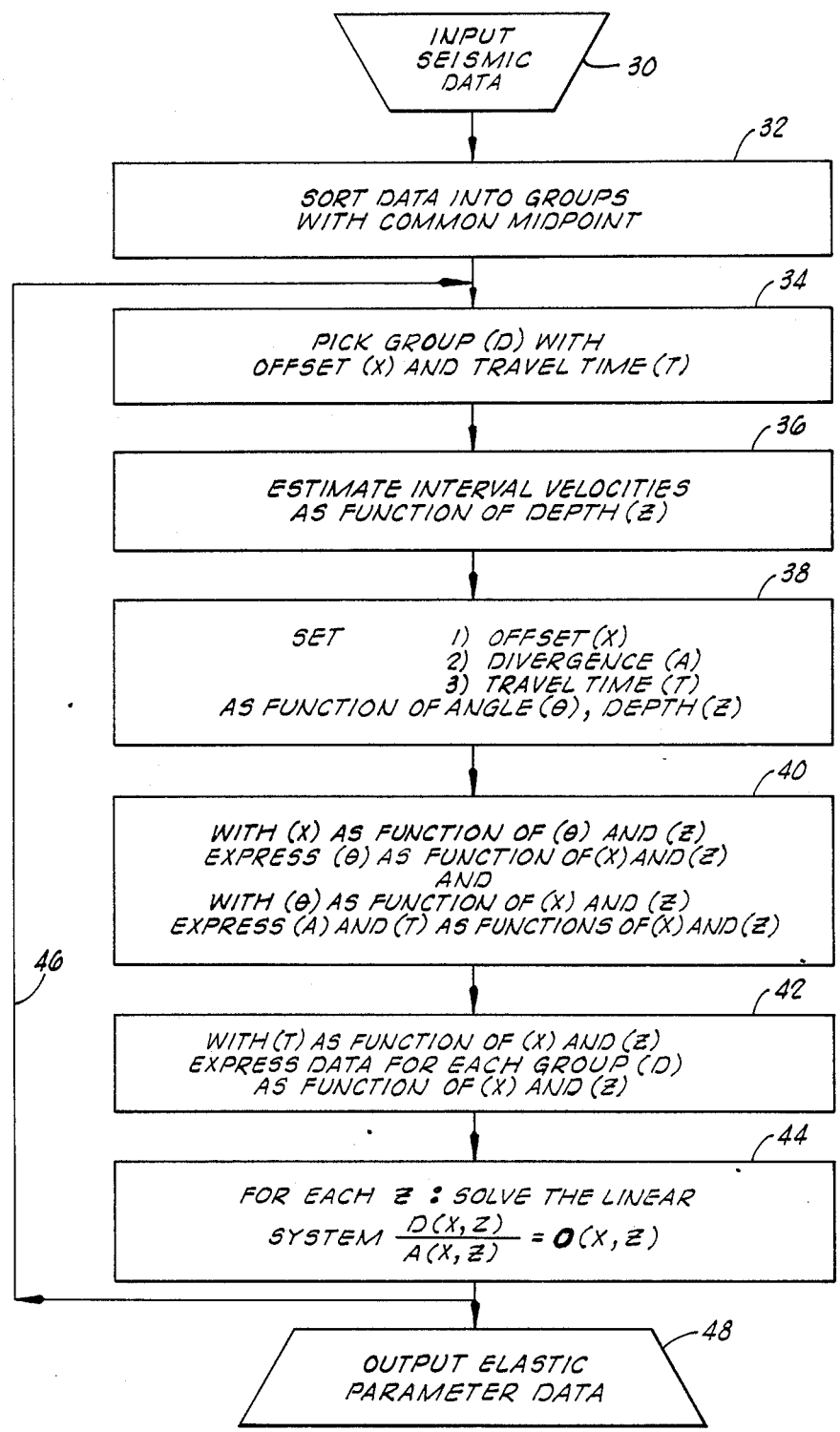
FIG. 2 is a flow diagram of the computational program of the present invention for deriving elastic parameter data output.

FIG. 2 illustrates a computer processing flow diagram for carrying out the present process. Seismic data is input at flow stage 30 in pre-processed form and flow stage 32 orders the data into common depth point sort groups, i.e. source-receiver data having the same midpoint or common depth point. Flow stage 34 selects a group D, that is a CDP group that is a function of selected source-receiver offset x and the source-reflector-receiver travel time T. Flow stage 36 then estimates the interval velocities as a function of depth z. This estimate can be input by the operator in accordance with previous knowledge of the field, or if prior data is not available, then specific velocity processing of the data can be performed to obtain the necessary input data.

Proceeding then to flow stage 38, the program functions to determine each of the offset x, divergence A, and travel time T as a function of angle of incidence $\theta$ and depth z for the depth point of interest. This involves solution of the far field WKBJ relationship for each of offset x, divergence A and two-way travel time T. For a layered, piecewise constant velocity media, the solutions are as follows:

$$T(\theta_n, z_n) = 2 \sum_{L=1}^{n} \frac{\Delta z_L}{V_L \cos\theta_L} \qquad (7)$$

$$X(\theta_n, z_n) = 2 \sum_{L=1}^{n} \Delta z_L \tan\theta_L \qquad (8)$$

$$A(\theta_n, z_n) = \frac{V_1}{2\cos\theta'}\left[\sum_{L=1}^{n}\frac{\Delta z_L V_L}{\cos\theta_L} \sum_{L'=1}^{n}\frac{\Delta z_{L'} V_{L'}}{\cos^3\theta_{L'}}\right]^{-\frac{1}{2}} \qquad (9)$$

Here, $Z_n = \sum_{L=1}^{n} \Delta z_L$, and $\theta_L$ for $1 \leq L < n$ is given by Snell's law, Equation (1).

Having determined x as a monotone function of $\theta$ and z, flow stage 40 functions to express $\theta$ as a function of x and z and, subsequently, using $\theta$ as a function of x and z to express A and T as functions of x and z. Then, in flow stage 42 with T as a function of x and z, the data for each group D can be expressed as a function of x and z. With all of T, A, 0 and D expressed as functions of x and z, flow proceeds to stage 44 wherein for each z, the linear system found by combining equations (1) and (2) is solved. Thus, $$\begin{aligned}\frac{D(x,z)}{A(x,z)} &= O(x,z) \\ &= \frac{1+\tan^2\theta(x,z)}{4}\frac{d\ln\gamma}{dz} - \\ &\quad \frac{1-\tan^2\theta(x,z)}{4}\frac{d\ln\rho}{dz} - \\ &\quad 2\sin^2\theta(x,z)\frac{V_s^2}{V_p^2}\frac{d\ln\mu}{dz}\end{aligned} \qquad (10)$$

Equation (10) is solved by matrix inversion of a linear system, a well-known computational routine, to determine the relative moduli and density as set forth in Equations (3), (4) and (5). This solution is effected by the method of least squares, and since seismic data is often contaminated, a two-pass procedure is used. If, after the first pass, some of the data is badly at variance with the first least square's estimate of the changes in the elastic parameters, the bad data is rejected and a new estimate is made. Suitable comparison criteria may be input by the operator.

After solution for elastic parameters at a selected z or depth on the seismic section in flow stage 44, the program recycles as indicated by flow line 46 to process data for a next selected depth z. As the elastic parameters for each depth z are determined they are available at the data output stage 48 for output in selected representation.

FIGS. 3-6 illustrate output data for a seismic survey line wherein surface offset distance is represented on the abscissa while depth in travel time (seconds) is illustrated on the ordinate. The output is a variable amplitude-type of presentation with white indicating negative values and black indicating positive values. The output presentations of FIGS. 3-6 clearly illustrate that a great number of intermediate depth strata have been processed in the operation; however, a stratum of particular interest lies at 1.5 seconds time (depth) where the location of existing wells No. 1 and No. 2 are indicated.

Well No. 2 was a gas producing well and well No. 1 could not be produced in commercial quantity.

Figure 3:
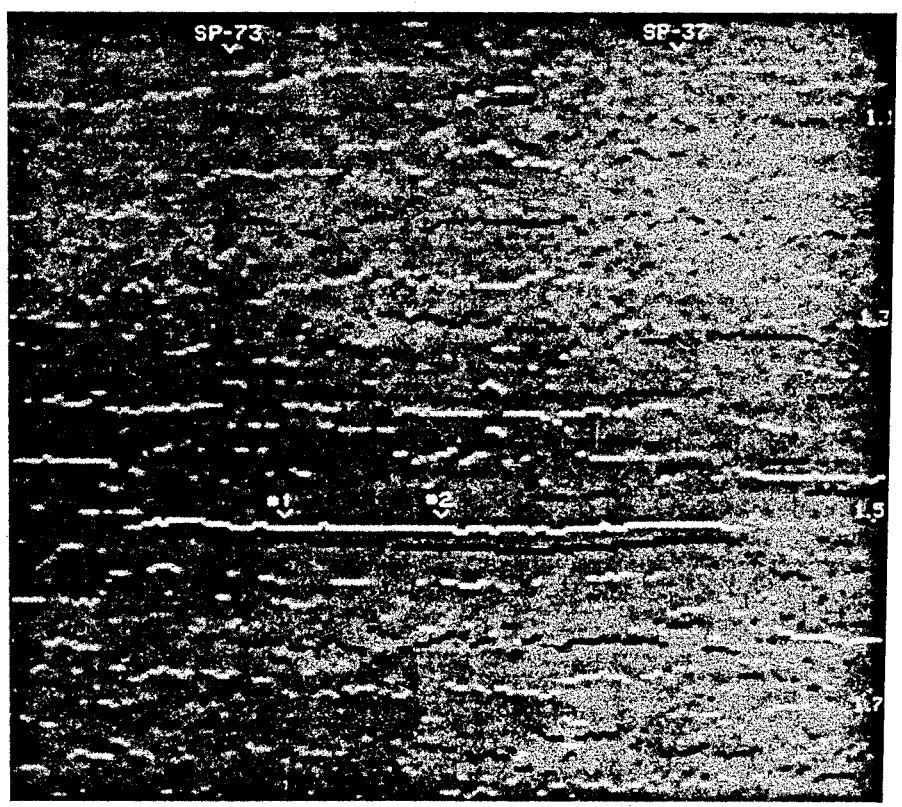
FIG. 3 is a photographic reproduction of a seismic survey line showing relative amplitude stack.
Figure 4:
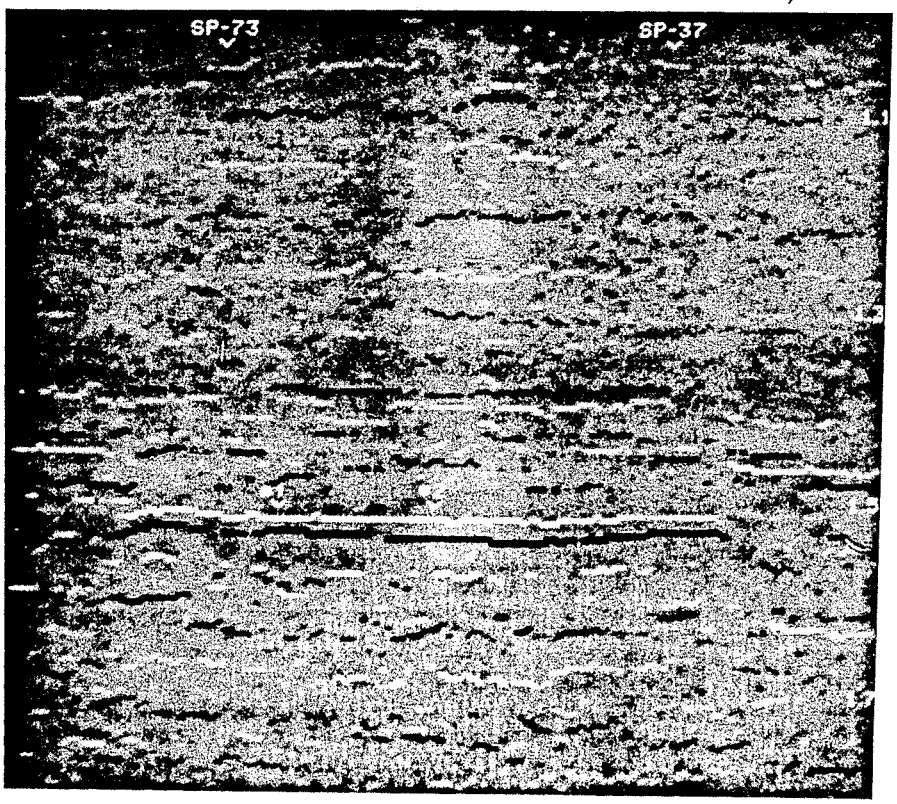
FIG. 4 is a photographic reproduction of a seismic survey line showing relative change in pressure modulus.

FIG. 3 is an output display of the relative amplitude stack for the seismic data of the section. A strong event response can be noted along the 1.5 second line with the white amplitude upper limits underlain by the counterpart black limits. FIG. 4 illustrates for the same section a relative change in pressure modulus display 52. Here again, one can discern the strong response at the 1.5 second time level, since in-phase with the relative amplitude stack of FIG. 3 and exhibiting nearly as strong response.

Figure 5:
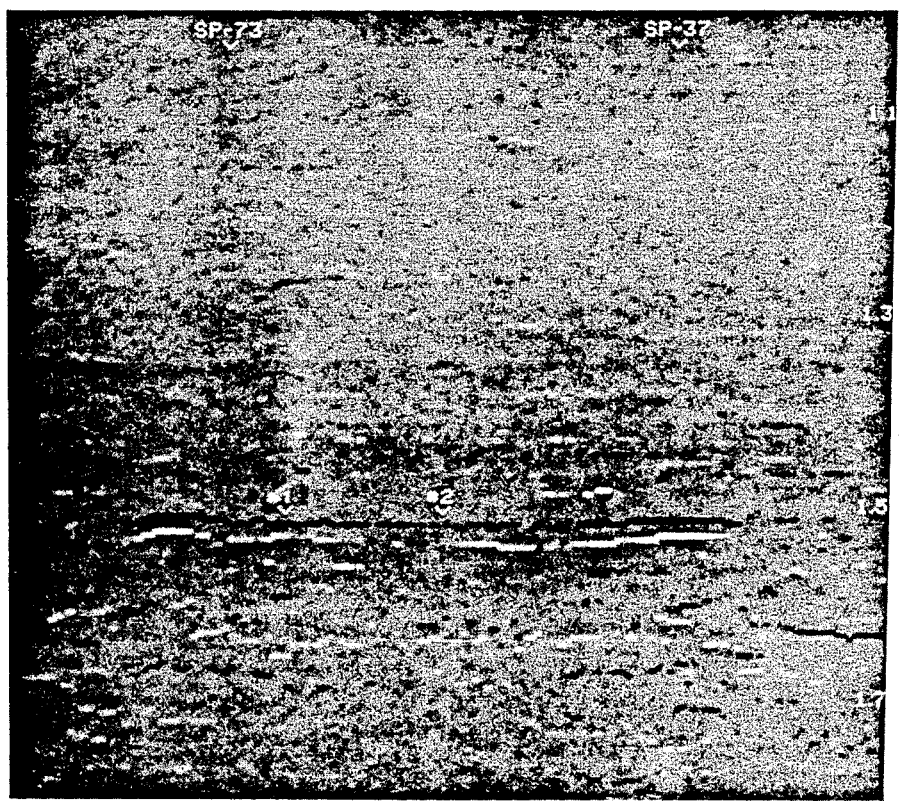
FIG. 5 is a photographic reproduction of a seismic survey line showing relative change in shear modulus.
Figure 6:
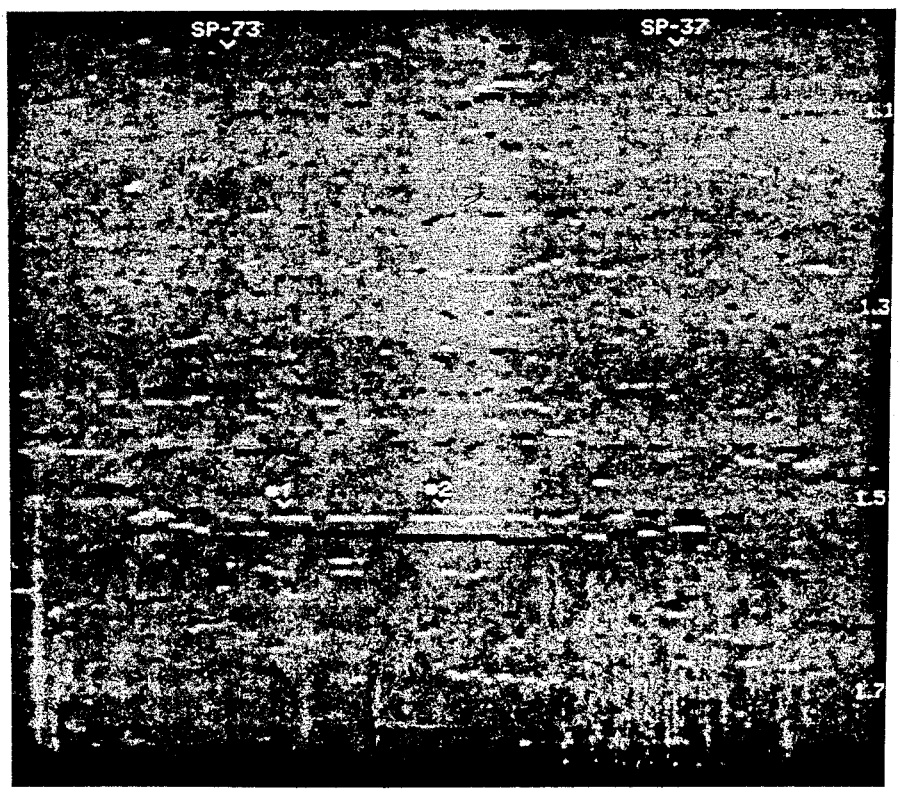
FIG. 6 is a photographic reproduction of a seismic survey line illustrating relative change in density.

A section 54 of FIG. 5 for the same section illustrates the data output for relative change in shear modulus. At the 1.5 second time line, the black response indicates a positive relative change in shear modulus, i.e. the shear modulus of the sandstone gas reservoir is greater than the shear modulus of the shale overlaying the gas reservoir. The display output 56 of FIG. 6 illustrates the same section line of the relative change in density, and the response is again in-phase with the relative amplitude stack display 50 (FIG. 3), the extremely bright response variation for the well No. 2 ordinate further bears out the favorable density and capability for gas production as is the fact.

The foregoing discloses a novel computer implemented data handling technique wherein common depth point seismic data is effectively linearized to define an obliquity factor for selected depths that enables determination of relative indications for certain elastic parameters. The method provides output data that is more nearly determinative of hydrocarbon production capability than conventional seismic sounding. Seismic data undergoing the present method may be variously pre-processed prior to entry for inversion processing.

Changes may be made in combination and arrangement of steps or routines as heretofore set forth in the specification and shown in the drawings; it being understood that changes may be made without departing from the spirit and scope of the invention.

The embodiment of the invention in which an exclusive property or privilege is claimed are defined as follows:

1. A method of seismic data processing to extract relative elastic parameter data output, comprising:
   obtaining and pre-processing seismic data along a selected survey line overlying locally layered substrata that necessarily exhibit locally negligible lateral change in elastic parameters;
   sorting the seismic data into data groups having the same common basement point;
2. A method as set forth in claim 1 wherein:
   the data group reflection strength equates to the product of the geometrical divergence and the obliquity factor.

3. A method as set forth in claim 2, wherein the step of determining for each data group and obliquity factor comprises:
   solving a linear system that equates to the obliquity factor by matrix inversion.
   outputting a display section of relative amplitude data for the seismic data groups;
   determining for each data group the geometrical divergence for each selected depth at each shotreceiver offset;
   determining for each data group an obliquity factor that is a function of the angle of incidence of seismic energy at the particular depth and the relative changes in selected elastic parameters at that depth; and
   outputting data group reflection strength indication of the relative changes in elastic parameters for at least one of pressure modulus, density, and shear modulus for selected depths for comparison to the section of relative amplitude seismic data for the data group in order to establish likelihood of subterrain quality.

4. A method of seismic data processing to extract relative elastic parameter data output, comprising:
   (a) obtaining and pre-processing seismic data along a survey line in selected terrain overlying locally layered substrata that necessarily exhibit locally negligible lateral change in elastic parameters;
   (b) inputting the seismic data for selected terrain for sorting to produce groups of seismic trace data having the same common depth point;
   (c) outputting a section display of relative amplitude data for the seismic trace data groups;
   (d) estimating seismic energy interval velocities as a function of depth for said terrain;
   (e) determining the offset, divergence and travel time as a function of the angle of incidence for selected depths for each seismic trace data group;
   (f) deriving the divergence and travel time data as functions of offset and depth and expressing each trace data group as a function of offset and selected depths;
   (g) determining the data group obliquity factor as a linear system that is a function of offset and selected depth;
   (h) solving the linear system by matrix inversion to derive elastic parameter relative values of pressure modulus, density and shear modulus for the data group selected depths; and
   (i) outputting the relative values of pressure modulus, density, and shear modulus for comparison with previous relative amplitude data for the same data group in order to determine likelihood of the subterrain quality.

5. A method as set forth in claim 4 which further includes:
   repeating steps (c) through (f) for each depth of interest for the data group.

* * * * *

UNITED STATES PATENT AND TRADEMARK OFFICE
CERTIFICATE OF CORRECTION

PATENT NO. : 4,924,390

DATED : May 8, 1990

INVENTOR(S) : Roger K. Parsons and Robert H. Stolt

It is certified that error appears in the above-identified patent and that said Letters Patent are hereby corrected as shown below:

Claim 1, col. 5, lines 47-55 and claim 3, col. 6, lines 1-22 are incorrect.

They should read as follows:

1. A method of seismic data processing to extract relative elastic parameter data output, comprising:

obtaining and pre-processing seismic data along a selected survey line overlying locally layered substrata that necessarily exhibit locally negligible lateral change in elastic parameters;

sorting the seismic data into data groups having the same common basement point;

outputting a display section of relative amplitude data for the seismic data groups;

determining for each data group the geometrical divergence for each selected depth at each shot-receiver offset;

determining for each data group an obliquity factor that is a function of the angle of incidence of seismic energy at the particular depth and the relative changes in selected elastic parameters at that depth; and outputting data group reflection strength indication of the relative changes in elastic parameters for at least one of pressure modulus, density, and shear modulus for selected depths for comparison to the section of relative amplitude seismic data for the data group in order to establish likelihood of subterrain quality.

UNITED STATES PATENT AND TRADEMARK OFFICE
CERTIFICATE OF CORRECTION

PATENT NO. : 4,924,390

DATED : May 8, 1990

INVENTOR(S) : Roger K. Parsons and Robert H. Stolt

It is certified that error appears in the above-identified patent and that said Letters Patent is hereby corrected as shown below:

(Continued)

3. A method as set forth in claim 2, wherein the step of determining for each data group and obliquity factor comprises:
    solving a linear system that equates to the obliquity factor by matrix inversion.

Signed and Sealed this

Thirtieth Day of June, 1992

Attest:

DOUGLAS B. COMER

*Attesting Officer*     *Acting Commissioner of Patents and Trademarks*